US012624543B2

(12) United States Patent　　　　　(10) Patent No.:　US 12,624,543 B2
Kleine-Natrop　　　　　　　　　　　　(45) Date of Patent:　May 12, 2026

(54) ROLL-OFF CONTAINER, SYSTEM WITH AT LEAST TWO ROLL-OFF CONTAINERS, AN EQUIPMENT TROLLEY SYSTEM AND USE OF A ROLL-OFF CONTAINER

(71) Applicant: R.M.R.H. Trop's System Innovations GmbH, Ettringen (DE)

(72) Inventor: Heinz Werner Kleine-Natrop, Ettringen (DE)

(73) Assignee: R.M.R.H. TROP'S SYSTEM INNOVATION GMBH, Ettringen (DE)

( * ) Notice: Subject to any disclaimer, the term of this patent is extended or adjusted under 35 U.S.C. 154(b) by 438 days.

(21) Appl. No.: 18/487,011

(22) Filed: Oct. 13, 2023

(65) Prior Publication Data

US 2024/0060290 A1　　Feb. 22, 2024

Related U.S. Application Data

(63) Continuation of application No. PCT/DE2022/100249, filed on Mar. 31, 2022.

(30) Foreign Application Priority Data

Apr. 19, 2021　　(DE) ............................ 202110109824

(51) Int. Cl.
　　*E04B 1/344*　　　　(2006.01)
　　*B62B 1/20*　　　　(2006.01)
　　　　(Continued)
(52) U.S. Cl.
　　CPC .............. *E04B 1/3444* (2013.01); *B62B 1/20* (2013.01); *B65D 88/005* (2013.01); *B65D 88/74* (2013.01);
　　　　(Continued)

(58) Field of Classification Search
　　CPC .. B62B 1/20; E04H 1/1205; E04H 2001/1283
　　　　(Continued)

(56) References Cited

U.S. PATENT DOCUMENTS 4,155,204 A * 5/1979 Prozinski ............ E04B 1/34336
　　　　　　　　　　　　　　　　　　　52/69
4,534,141 A * 8/1985 Fagnoni ................ E04B 1/3444
　　　　　　　　　　　　　　　　　　　52/68
　　　　(Continued)

FOREIGN PATENT DOCUMENTS

CN　　　2203990 Y　　7/1995
DE　102021109824 B3　　4/2022
　　　　(Continued)

OTHER PUBLICATIONS

International Search Report & The Written Opinion of the International Searching Authority dated Oct. 27, 2022, International Application No. PCT/DE2022/100249 filed Mar. 31, 2022.
　　　　(Continued)

*Primary Examiner* — Babajide A Demuren
(74) *Attorney, Agent, or Firm* — Pearl Cohen Zedek Latzer Baratz LLP

(57)　　　　ABSTRACT

A roll-off container, a system consisting of at least two roll-off containers, an equipment trolley system and the use of a roll-off container are described. The roll-off container comprises a main frame arranged on a platform. The platform comprises attachment rollers on its bottom side and an upward-pointing hook with a transverse strut on a face side. The main frame comprises a bottom, side walls, and roof sections. On an upper end of the main frame on both longitudinal sides, a roof structure is rotatably mounted, wherein the roof structure comprises at least first and second roof-frame sections, each having a width equal to a height of (Continued)

the side walls of the main frame, and a length of which corresponds to a length of the main frame.

18 Claims, 12 Drawing Sheets

(51) Int. Cl.
B65D 88/00 (2006.01)
B65D 88/74 (2006.01)
(52) U.S. Cl.
CPC ...... *B62B 2202/50* (2013.01); *B65D 2588/12* (2013.01)
(58) Field of Classification Search
USPC .................................. 52/65.71, 79.5, 243.1
See application file for complete search history.

(56) References Cited

U.S. PATENT DOCUMENTS

| | | | | | |
|---|---|---|---|---|---|
| 4,545,171 | A | * | 10/1985 | Colvin .................. | E04B 1/3442 52/79.5 |
| 4,780,996 | A | * | 11/1988 | Julien, Jr. ............. | E04B 1/3444 52/79.5 |
| 4,912,891 | A | * | 4/1990 | Bertrand ............... | E04B 1/3444 52/66 |
| 5,596,844 | A | * | 1/1997 | Kalinowski ........... | E04B 1/3442 52/79.5 |
| 5,778,604 | A | * | 7/1998 | Snow ................... | E04H 1/1205 52/36.2 |
| 5,966,956 | A | * | 10/1999 | Morris ................. | E04B 1/3444 52/79.5 |
| 6,223,479 | B1 | * | 5/2001 | Stockli ................. | E04B 1/3444 52/68 |
| 6,345,471 | B1 | * | 2/2002 | Gyllenhammar ..... | E04B 1/3444 296/26.02 |
| 6,393,769 | B1 | * | 5/2002 | Mertik ...................... | E04H 3/28 296/26.14 |
| 6,772,563 | B2 | * | 8/2004 | Kuhn .................. | E04B 1/34305 52/79.5 |
| 6,997,495 | B1 | * | 2/2006 | Groezinger ............. | B60P 3/025 296/26.15 |
| 7,117,645 | B2 | * | 10/2006 | Bzorgi .................. | E04B 1/3442 52/79.5 |
| 7,418,802 | B2 | * | 9/2008 | Sarine ................. | E04B 1/34305 52/79.5 |
| 7,784,845 | B2 | * | 8/2010 | Kim ...................... | E04B 1/3444 52/79.5 |
| 7,832,151 | B2 | * | 11/2010 | Harrisson ............... | E04B 7/022 52/79.5 |
| 2005/0044804 | A1 | * | 3/2005 | Bin ....................... | E04B 1/3445 52/79.5 |
| 2005/0120639 | A1 | * | 6/2005 | Bucher ................. | E04B 1/3431 52/64 |
| 2008/0142059 | A1 | * | 6/2008 | Bonebrake ............ | E04B 1/3444 135/88.1 |
| 2008/0236055 | A1 | * | 10/2008 | Laprise ................. | E04B 1/3444 52/64 |

FOREIGN PATENT DOCUMENTS

| | | | | |
|---|---|---|---|---|
| WO | WO-9613402 A1 * | 5/1996 | .......... | E04B 1/3444 |
| WO | WO2015/155695 A1 | 10/2015 | | |
| WO | WO2022/223070 A1 | 10/2022 | | |

OTHER PUBLICATIONS

English Abstract of CN Publication No. CN2203990 published Jul. 26, 1995.
English Abstract of PCT Publication No. WO2022/23070 published Oct. 27, 2022.
English Abstract of DE Publication No. DE102021109824 published Apr. 17, 2022.

* cited by examiner 116,
117

116,
117

130

126          126          126          126

124

128          128          128          128

126          126          126          126

122

ROLL-OFF CONTAINER, SYSTEM WITH AT LEAST TWO ROLL-OFF CONTAINERS, AN EQUIPMENT TROLLEY SYSTEM AND USE OF A ROLL-OFF CONTAINER

PRIORITY CLAIM

This application is a continuation of and claims priority to International Application No. PCT/DE2022/100249 titled "ROLL-OFF CONTAINER, SYSTEM WITH AT LEAST TWO ROLL-OFF CONTAINERS, AN EQUIPMENT TROLLEY SYSTEM AND USE OF A ROLL-OFF CONTAINER," filed Mar. 31, 2022, which claims priority to German Patent Application No. DE102021109824.6, titled "ROLL-OFF CONTAINER, SYSTEM WITH AT LEAST TWO ROLL-OFF CONTAINERS, AN EQUIPMENT TROLLEY SYSTEM AND USE OF A ROLL-OFF CONTAINER," filed Apr. 19, 2021. Priority is claimed to each of the above applications, and each of the above applications is incorporated herein by reference.

BACKGROUND

A roll-off container, a system consisting of at least two roll-off containers, an equipment trolley system and the use of a roll-off container are described.

Roll-off containers are used for various purposes, wherein roll-off containers can be picked up, transported and set down again by a swap-body vehicle, thus making the vehicle available for further tasks. This means that the vehicle and the body are not permanently installed together and do not form a permanent unit. This results in a plurality of advantages, such as availability, customization of the containers, quick adaptation to tasks/use, space requirements, etc. for example.

Particularly in the medical sector and rescue services, such roll-off containers are known in various embodiments and are used, for example, by fire brigades, disaster control, medical services and the German Armed Forces.

For example, a disaster-control unit that takes action in the event of a major damage situation with many injured persons or in the event of pandemics, evacuation and medical care situations must set up a treatment or supply station at the site of the accident or in the immediate vicinity of it. If available, this can be done in permanent buildings, such as schools, sports halls, community houses or similar. If such buildings are not available, wherein this circumstance often occurs, tents of various types (e.g., air or pole tents) are set up and furnished. In the tents, additional light strips must be laid and supplied with electricity, and the tents must be heated if necessary. However, it is not possible to air condition tents, as they cannot be kept closed off from their surroundings. Air conditioning would therefore only be possible with a disproportionate amount of effort. For this reason, for example, such tents are unsuitable for use in summer with temperatures above 40° C.

Both the medical material as well as the tents themselves are brought to the damage site in so-called equipment trolleys. Such equipment trolleys are available as trucks with tail lifts or without tail lifts, equipment trolleys with fixed divisions or also swap-body vehicles with roll-off containers, wherein these vehicles possess, for example, a trolley system with a roll container, as they are known from the food retail trade. The roll containers are used to transport materials. In this case, the load is only transported from one location to another location and set up at the destination.

This takes a lot of time, and the vehicle can no longer be used for any other purpose. Empty vehicles and roll-off containers then stand around.

Furthermore, the unloading of these equipment trolleys and the construction of the treatment station requires a lot of personnel (at least 10-12 helpers) and takes a lot of time. For example, at least 20-25 minutes are needed per helper (i.e., a total of at least 200 minutes-300 minutes of total set-up time helper minutes). Depending on the design of the equipment trolleys, there is also the fact that equipment trolleys with fixed shelving systems often have a step at the bottom of the vehicle to climb on in order to be able to remove the materials (boxes) arranged in the upper regions. However, there is an increased risk of accidents, particularly for people that are of small stature.

Furthermore, the vehicles can no longer be used for further transport, as these vehicles have a fixed shelving system. With all known systems of equipment trolleys, the helpers can be extremely hindered and soaked during heavy rainfall and a thunderstorm when removing the materials, wherein this also applies to electrical devices and materials of any kind to be removed.

The set-up must be carried out in parallel with the initial care of the injured or ill persons concerned. Thanks to the well-known solutions, personnel who have medical training as paramedics, paramedics or emergency paramedics, for example, are used to set up tents and set them up for emergency care. However, it is precisely these helpers who are urgently needed for the medical care of the injured, ill or evacuated people. This is particularly critical in rural regions in Germany and Europe, because there are not enough helpers available to care for the injured, for example in times of low daily numbers of volunteer units and when all rescue equipment of the public rescue service is at full capacity. This is also a very big problem due to staff shortages in the rescue service, which cannot be filled.

It should also be noted that by the time the construction has taken place, the critical phase in which care or medical care is required is often over. For this reason, too, the known devices are therefore not usable for the intended purpose.

For example, CH 291 760 A discloses a transportable structure for accommodation and work purposes, which is composed of a plurality of parts and has extending structural elements, such as side wall panels and roof sections. The roof sections consist of V-shaped hinged folding elements. The transportable structure offers the possibility of providing an enlarged space based on a transportable body of a vehicle.

In the case of prior art, it is also the case that the assembly is generally very complex and therefore requires a lot of time. Furthermore, in order to provide a network of a plurality of such vehicles, a rail system is required, which provides height compensation by means of support blocks and ensures an exact arrangement of the individual vehicles in relation to each other.

A task of an embodiment of the present invention can therefore be seen in providing a transportable unit with which an extended or expandable application space can be provided in a short time, which can be used for different purposes and tasks, wherein it is also possible to transport material and adapt it to different requirements.

According to one aspect, such an embodiment, at least according to a core idea of the invention, relates to a roll-off container, comprising a main frame arranged on a platform, wherein the roll-off container comprises a rectangular base area, and the platform comprises attachment rollers on its bottom side and an upward-pointing hook with a transverse strut on a face side, wherein the main frame comprises bottom, side and roof sections, and wherein, on the upper end of the main frame on both longitudinal sides, a roof structure consisting of at least two parts is rotatably mounted, wherein the roof structure comprises at least two roof-frame sections, the width of which corresponds to the height of the side walls of the main frame, and the length of which is equal to the length of the main frame, wherein a first roof-frame section can be moved via at least one first drive element, and the first roof-frame section with the second roof-frame section can be moved via at least one second drive element, wherein side frames are rotatably mounted on lateral struts of the main frame on both sides respectively on a front end and a rear end of the main frame, wherein the side frames, starting from the connection point on the main frame, have a height sloping towards the end, wherein the side frames can be respectively rotated via at least one third drive element, wherein an enlargement of the base area of the roll-off container can be provided in a position of use via the rotatably mounted side frames and the roof structure, and wherein the rotatably mounted side frames and the roof structure can be moved via remote control.

The structure of the roll-off container is characterized in that the interior space of the container is not limited by components to enlarge the interior space spanning over the main frame when the roof-frame sections and the side frames are in a position of non-use, wherein the side frames rest parallel to each other on the corresponding sides of the main frame, and, parallel to this towards the outside, the roof-frame sections are arranged parallel to each other and parallel to the sides of the main frame on the side frames.

Based on the position of non-use, a defined movement takes place via the drive elements, wherein the roof-frame sections are initially rotated. In this case, the first roof-frame section is initially swivelled and then, there is another swivelling together of both roof-frame sections towards each other as well as a swivelling of the first roof-frame section until they have assumed the position of use.

The two side frames are rotated on the respective sides via the corresponding drive elements, wherein the side frame is rotated first, which is parallel to the other side frame from the outside. After this first side frame has been moved, the second side frame is also rotated with a time delay until both side frames have assumed their position of use and are essentially aligned and arranged orthogonally to the lateral surface of the main frame. The roof-frame sections then rest on the top sides of the side frames. This means that a five-fold enlargement of the interior space spanning across the main frame can take place while simultaneously moving the roof-frame sections and the side frame on both sides of the main frame.

However, it is also possible to rotate the corresponding roof-frame sections and the side frames on only one side of the main frame, wherein an approximately a three-fold enlargement of the spanned space is provided. Even in such a position of use, the roof-frame sections and the side frames do not project into the interior space of the main frame on the unopened side so that the latter is also fully available for various purposes.

In the position of non-use, wherein the side frames and the roof-frame sections are against the main frame on both sides of it, materials of any kind can be transported in the interior space of the main frame, which are then needed in the position of use (e.g., for the treatment of injured persons, etc.).

Depending on the embodiment, the side frames can have different lengths, wherein the side frames generally comprises an upper support section, which is as long as the length of the roof structure in the position of use starting from the main frame.

In other embodiments, wherein, for example, the roof structure is made of multiple parts and, for example, comprises three, four or a plurality of roof-frame sections, which, for example, have a width corresponding to the height of the side walls of the main frame, the length of the side frames in the position of use corresponds to the total width of all roof-frame sections. The roof-frame sections are connected to each other via hinges and drives and can be moved from the position of non-use into the position of use and vice versa. The side frames can also be moved via hinges and additional drives. This ensures that the side frames do not project from the main frame in the position of non-use and that a compact embodiment is given. In such embodiments, a significant enlargement of space provided by the roll-off container in the position of use can be achieved.

The drive elements can be, for example, linear actuators. Linear actuators are not limited to pneumatic or hydraulic linear actuators and linear actuators.

The structure of the roll-off container, consisting of the platform and the main frame with the roof-frame sections arranged on the sides in the position of non-use and the side frames, can be selected in such a way that the requirements in accordance with DIN 30722 are met. In this way, it can also be ensured that the roll-off container does not exceed a total height of 4 m when loaded together with a swap-body vehicle. The length of the roll-off container and the main frame can be specified according to requirements. The height of the main frame and its length determine the size of the space of the main frame and the space spanned across the main frame and the roof-frame sections as well as the side frame in the position of use.

Favourably, the spanned space can be enlarged, e.g., via remote control of the drive elements, which then rotate the roof-frame sections and the side frames in the specified sequential order. This means that assembly can be accomplished in a period of, for example, 1 to 3 minutes (depending on the embodiment). A time-consuming assembly, as is the case with the systems known from prior art, can thus be dispensed with, wherein no rail systems or compensating support elements are required.

Remote-controlled within the meaning of the invention therefore means, in particular, that, starting from a defined main-frame size, the side-frame sections and the roof-frame sections, among other things, are mechanically connected and arranged in such a way that they can be moved without manual intervention, meaning, among other things, via a targeted electromechanical drive coupling by means of hinges and drives of the individual frame sections in such a way that the roll-off container can also be moved without manual intervention in accordance with a defined transfer scheme, thereby being able to be transferred to a specific or different size of the positions of use in a short amount of time.

The roof-frame sections, the side frames and the main frame can be designed to be closed on the outer walls and, for example, provided with wall elements made of wood, plastic or a composite material as well as metal parts, forming a closed outer surface both in the position of non-use as well as in the position of use.

A tarpaulin can be placed on the free edge of the second roof-frame sections, which is separated from the main frame in the position of use, in order to also seal this side as well. The tarpaulin can then also be connected to the side frames and, in other embodiments, to a floor tarpaulin. The tarpaulin can include windows and/or access. Alternatively, fixed wall elements can also be inserted between the side frames and connected to the second roof-frame section and a floor tarpaulin in a sealed manner. In alternative embodiments, a tarpaulin can also be firmly attached to the free edge of the second roof-frame sections. For example, the tarpaulin can be folded or rolled up in the position of non-use (via a motor-driven roller, for example).

In other embodiments, the first roof-frame sections and/or the second roof-frame sections on their facing sides in the position of use, and/or the first roof-frame sections and/or the main frame on their facing sides in the position of use, and/or the side frames and/or the main frame on the lateral struts on their facing sides in the position of use, and/or the side frames and/or the roof-frame sections of the roof structure on their facing sides the position of use can each comprise at least one seal. This ensures that a sealed space can be provided via the frame sections, which is sealed when the free side is closed further so that air conditioning is also possible with little use of resources. Furthermore, it can be used to prevent wind, for example, from penetrating through gaps in the spanned space. The seal itself can be provided by various means, wherein, for example, plastics or rubber-like materials can be provided, which are designed as continuous sealing lips for example. In other embodiments, a plurality of parallel sealing systems can also be provided in order to achieve an additional improved seal.

In other embodiments, the first roof-frame sections and the second roof-frame sections, and/or the first roof-frame sections and the main frame, and/or the side frames and the main frame on the lateral struts can be connected to each other by at least one hinge. For this purpose, the hinges can preferably be designed in such a way that they only allow the corresponding frame sections to be rotated or swivelled in the desired direction and back again for moving into the position of use and the position of non-use. This prevents movement beyond a position of use.

In other embodiments, a rotatable roller can be arranged below the main frame on both longitudinal sides, on which a floor tarpaulin is wound up so that it can be rolled up. The floor tarpaulin can then be unwound in the position of use, wherein motor support can also be provided for this purpose. For example, an electric motor can be provided to drive the roller. This means that winding up the roll can also be achieved without much effort.

In other embodiments, the floor tarpaulin can be connected to the bottom side of the side frames when unrolled in the position of use. The floor tarpaulin can be connected to the side frames so that a seal is also achieved in the area of the floor and the space is shielded from the surroundings.

In other embodiments, a downwardly projecting tarpaulin can be arranged on the bottom sides of the side frames or provided to be connectable to it, wherein the tarpaulin comprises a section on its bottom side, which can be designed as a bead and which can be filled in order to compensate for unevenness in relation to a substrate, to seal it and to weigh down the roll-off container in addition to securing it.

In other embodiments, the main frame can have an overhang on the longitudinal sides, on the bottom side of which at least one seal is arranged, which rests against the respective first roof-frame section in the position of use. The overhang is a roof element that essentially projects from the main frame as far as the side frames and the roof-frame sections in the position of non-use.

In other embodiments, supports can be provided on the side frames, which are intended to support the side frames and can be changed in length. For example, the supports can be extended by motor or manually. The supports are preferably located at the extreme end of the side frames in the position of use. In other embodiments, further supports on the side frames can also be provided between the outermost point of the side frames and the main frame.

In addition, depending on the intended use or load, hydraulically extendable floor supports can be provided on the main frame as a replacement or in addition to the side frame supports, in the direction of the side frames on the left and right as well as vertically (towards the ground), wherein the support or base width can be increased and the roll-off container receives greater stability, in particular, improved tilting stability towards the side frame.

In other embodiments, the roll-off container can comprise a supply unit that comprises components for power supply, air conditioning and heating, and a contact interface to the external energy, information, material and water supply as well as gases. This means that the roll-off container can be operated autonomously and, for example, supplied with energy, water, etc. during assembly and dismantling via a connected swap-body vehicle.

In other embodiments, the roof-frame sections can comprise fasteners on their free sides, via which side walls and/or connecting elements can be attached.

In other embodiments, supply lines for power supply, communication and/or material supply can be arranged in the main frame, side frames and/or roof-frame sections.

In other embodiments, supports can be arranged on the platform and/or on the main frame, which can be extended or rotated via at least a fourth drive element to widen the support of the roll-off container. The supports then extend in the extended position at their bottom and/or top side at the level of the platform so that the platform comprises lateral bracing supports and thus the support is widespread. This can be used to support the tilting of the roll-off container, particularly also in unfavourable weather conditions (e.g., wind) or unfavourable ground conditions (e.g., uneven substrate) as well as during assembly (e.g., when swivelling the side frames).

In other embodiments, the roll-off container can comprise a control unit that is connected to the drive elements via means of operating the drive elements, wherein the control unit comprises an interface for remote operation of the adjustable side frames and roof-frame sections.

In other embodiments, the interface can be a contactless interface or an interface with a physical contact. This means, for example, that a smartphone with an associated app can be used to control the assembly and dismantling of the roll-off container or a swivelling of the side frames and roof-frame sections. The interface can also be used to retrieve system data of the roll-off container or the units connected and/or integrated to it, as well as of other units, such as a storage tank for water, liquids, gases, etc. for example and/or the state of charge of a power storage device of the roll-off container for example. In addition, such an interface and appropriate software can be used, for example, to control an air conditioning system and/or the lighting of the roll-off container.

The above-mentioned task is also achieved by means a system consisting of at least two roll-off containers in accordance with the embodiments described above, wherein a connecting tarpaulin is arranged between the at least two roll-off containers, which can be connected to corresponding sides of the roof-frame sections, wherein the connecting tarpaulin have a length corresponding to the corresponding roof-frame sections and a width varying across the length so that, in a parallel arrangement of the roof-frame sections of the at least two roll-off containers, a rainwater gutter is provided over the connecting tarpaulin.

A plurality of roll-off containers can be connected to each other, wherein side connecting elements can be attached to the corresponding side frames and floor-connecting elements can be attached to the floor tarpaulins. In other embodiments, a floor tarpaulin of a roll-off container or the floor tarpaulins of two roll-off containers to be connected to each other can also be connected to each other. The connecting tarpaulin is then used from above to provide a connection of two roll-off containers in the position of use as well as a rainwater gutter so that rainwater cannot collect in the connecting region of the two roll-off containers but is discharged.

In order to ensure a defined formation of the connecting tarpaulin in the position of use as a rainwater gutter, connecting elements, such as ropes, Keder rails or the like, can be provided at regular intervals on the connecting tarpaulin, which connect the two longitudinal sides of the connecting tarpaulin with each other. The connecting elements are the same length along the length of the connecting tarpaulin, but shorter than the width of the connecting tarpaulin at its widest point. This ensures a gutter-like formation at a defined distance between two roll-off containers.

A plurality of roll-off containers can be connected via other connecting tarpaulins and other connecting elements (such as tarpaulins, wall elements, floor tarpaulins or elements, etc.) so that a space of any size can be provided.

In accordance with another aspect, an embodiment according to the invention also relates to an equipment trolley system consisting of a swap-body vehicle and a roll-off container in accordance with one of the embodiments described above.

The swap-body vehicle and a roll-off container form a single unit. Depending on the requirements and tasks, the unit is moved to a destination, wherein the roll-off container is unloaded, as is customary for such containers. There can be an electrical connection via a connecting line during unloading or after unloading and/or a connection via a hydraulic or compressed air hose. This means that the energy required for assembly can then be provided by means of the supply via the swap-body vehicle. After the roll-off container has been set up automatically, the connection can be cut, and further supply is carried out via the supply units and supply modules of the roll-off container. In other embodiments, it is also possible to supply the necessary means for assembly and dismantling by the supply units of the roll-off container so that no swap-body vehicle is required for this, and/or that a supply is also provided by a swap-body vehicle during operation or use of the roll-off container.

In other embodiments, the roll-off container can also be connected to locally available supply systems (electricity, water, wastewater, compressed air, etc.).

In accordance with another aspect, another embodiment according to the invention also relates to the use of a roll-off container in accordance with one of the embodiments described above as a means of transport, treatment container, intensive-care unit, mobile vaccination station, accident-aid station, evacuation station, isolation ward, intensive-care unit, kitchen, supply station, observation station, shelter and/or first-aid station. In addition, areas of application can be: In the fire-fighting field, in decontamination and as a radio operations centre.

Further advantages, features and design possibilities result from the following figure description of non-restrictive exemplary embodiments.

DETAILED DESCRIPTION

Elements bearing the same reference numbers in the figures are essentially the same as each other, unless otherwise specified. In addition, showing and describing components that are not essential to the understanding of the technical doctrine disclosed herein have been dispensed with. In addition, the reference numbers are not repeated for all elements that have already been introduced and displayed, provided that the elements themselves and their function have already been described.

With reference to FIGS. 1-21, an exemplary embodiment of a roll-off container 100 according to the invention is described.

The roll-off container 100 can be used for various purposes and can comprise corresponding embodiments. In addition, roll-off container 100 can be loaded in the position of non-use shown in FIG. 1 with appropriate components, devices and objects that can be removed from roll-off container 100 after roll-off container 100 has been moved into the position of use.

In the exemplary embodiment shown, roll-off container 100 is part of a "Rolling Multi Rescue Health System" (R.M.R.H. System), wherein the invention is not limited to this.

This is a new concept for the stockpiling of materials, the transport of materials, as well as the construction and operation of a treatment station in large and large situations of disaster control, and not only for the medical care of injured and ill people, but also for the treatment and care of uninjured and non-ill affected persons, but also for the fire-brigade technical service, as already described.

In the exemplary embodiment shown, roll-off container 100 is a rescue container that can be transported via a swap-body vehicle (not shown in the figure). The swap-body vehicle can also be part of the R.M.R.H. system. In principle, swap-body vehicles can be used for the concept described here, as they are known from prior art.

The advantages of the new system are, for example, that the roll-off container can bring 100 supplies for injured people, but simultaneously provides a treatment station after unloading.

Figure 1:
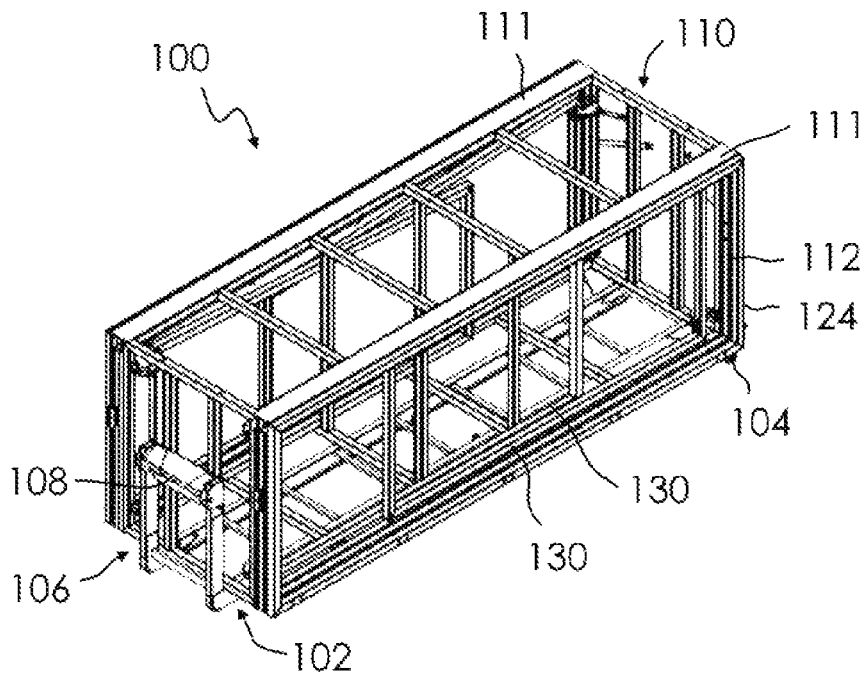
FIGS. 1-2 show perspective illustrations of a roll-off container according to the invention in a position of non-use.
Figure 2:
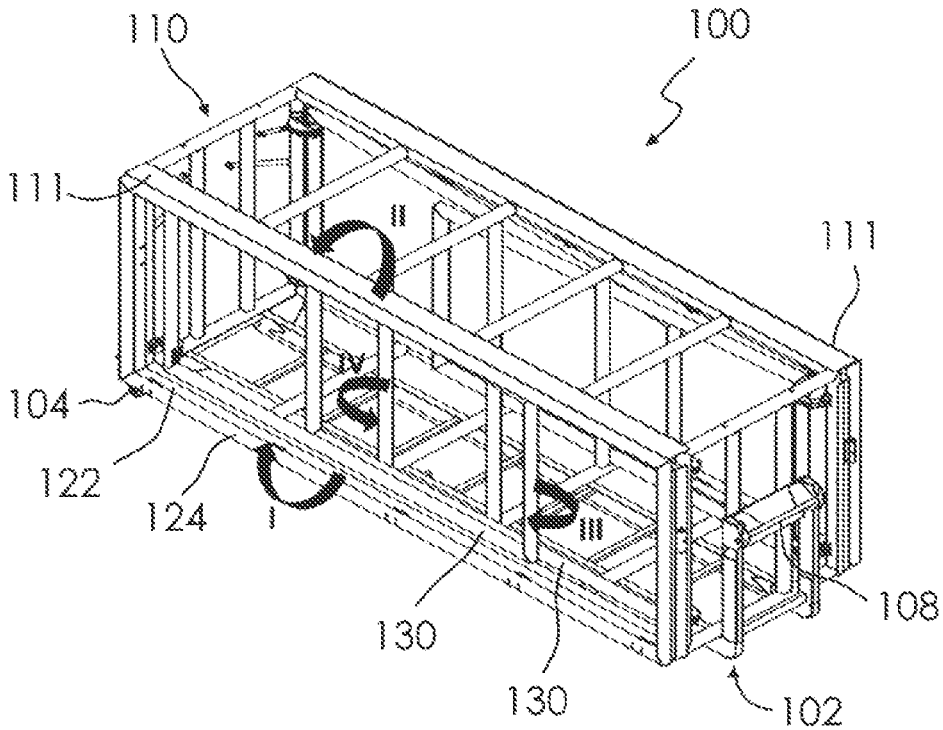

FIGS. 1 and 2 show perspective illustrations of a roll-off container 100 according to the invention in a position of non-use.

The roll-off container 100 has a platform 102. The platform 102 forms the basis for roll-off container 100 and has a hook 106 with a transverse strut 108 on the front end of the roll-off container 100, which can be used to pick up and set down the roll-off container 100 via platform 102 by a swap-body vehicle. On the platform 102, in the rear area, facing away from the face side with hook 106, attachment rollers 104 (see FIG. 3) are arranged and rotatably mounted to facilitate placement of the container and picking it up.

A main frame 110 is arranged on platform 102. The main frame 110 consists of struts and connecting parts that form a floor surface, side walls and a roof. In the figures, only the basic structure is shown, but it is provided that the surfaces and walls, for example, are covered and sealed in the required way.

On the two longitudinal sides of the main frame 110 there is a roof structure 120 with two roof-frame sections 122 and 124, which can be moved relative to each other and relative to the main frame 110 via hinges 126, 128 and hydraulic cylinders 121, 123. In addition, side frames 130 are provided, which can be moved via hinges 116, 117 and hydraulic cylinders 132 on lateral struts 114 of the main frame 110.

Figure 5:
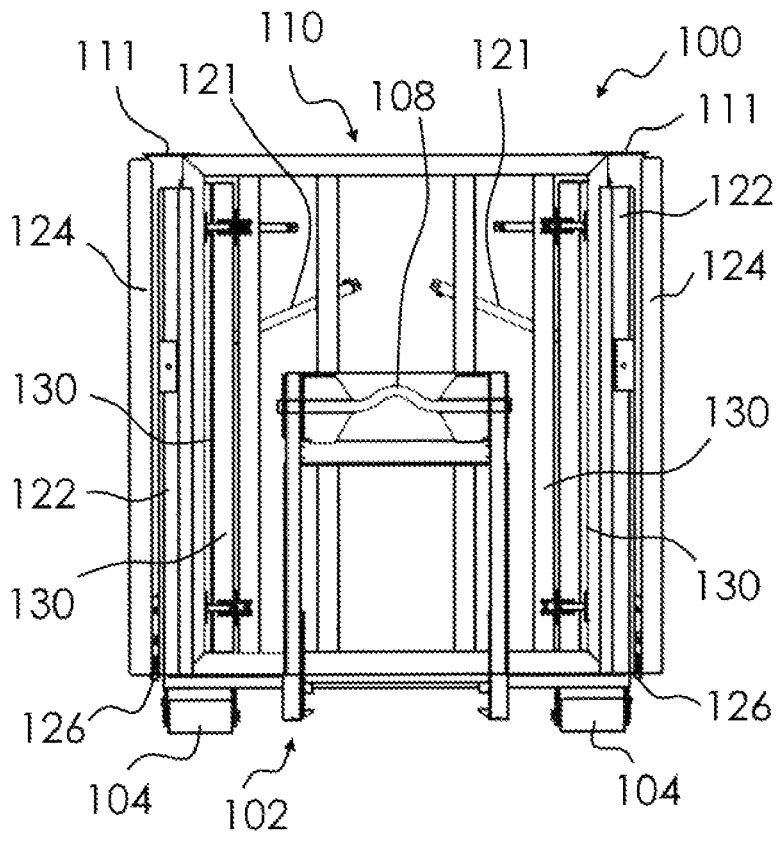

As shown in FIG. 5, in the position of non-use, the roof-frame sections 122, 124 project from the side walls of the main frame 110. Therefore, the main frame 110 has overhangs 111 on the sides, which cover the projecting parts in the position of non-use.

The components of platform 102 and main frame 110 are made of metal or metal alloy and can be made of profile bodies for example. For the main frame 110, profiles and materials must be chosen that can withstand high loads with low weight so that a stable embodiment of the main frame 110 and thus of the roll-off container 100 is achieved.

Figure 3:
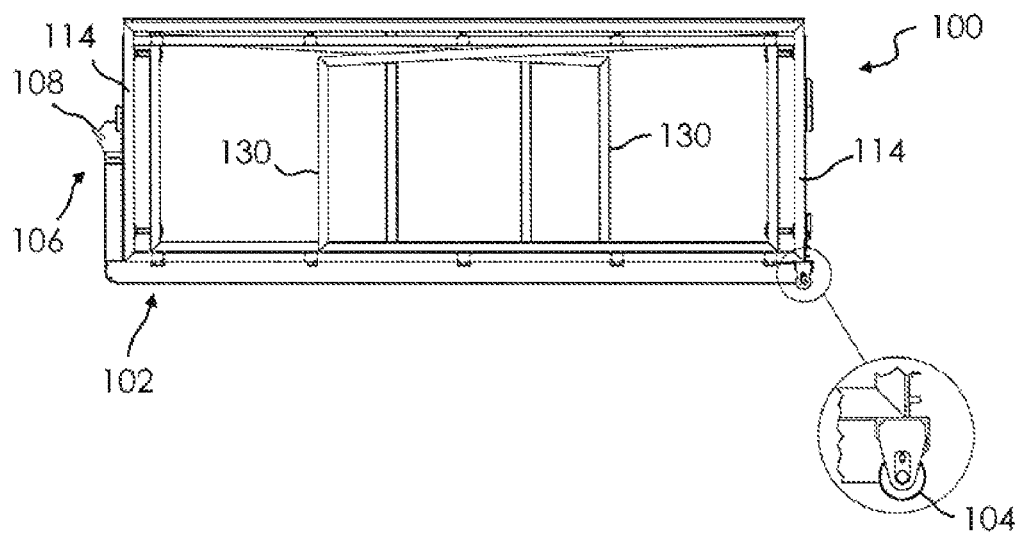
FIGS. 3-6 show different views of the roll-off container according to the invention.

FIGS. 3-6 show different views of the roll-off container 100 according to the invention. FIG. 3 shows that the side frames 130 run parallel to each other and parallel to the side walls of the main frame 110 in the position of non-use, wherein length of the side frames 130 in the embodiment shown is less than the length of the side walls of the main frame 110.

Figure 4:
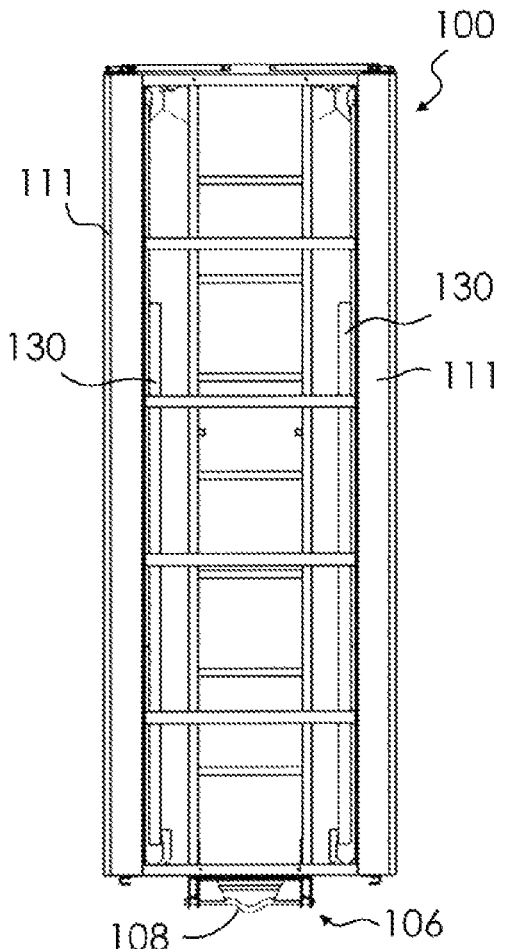

FIG. 4 shows that at least the side frames 130 partially project into the interior space of the main frame 110 in the position of non-use, wherein the interior space of the main frame 110 remains essentially free and can thus be used in the position of non-use, for example, as a storage area for transporting a wide variety of materials and objects.

FIG. 5 shows the view of the front end of the roll-off container 100, wherein, in particular, the arrangement of the roof structure 120 with the roof-frame sections 122, 124 and the side frame 130 in the position of non-use are shown. In addition, hydraulic cylinders 121 are shown, which are used to rotate the roof structure 120 with the roof-frame sections 122, 124 from the position of non-use shown in FIG. 5 to the position of use shown in FIG. 12.

Figure 6:
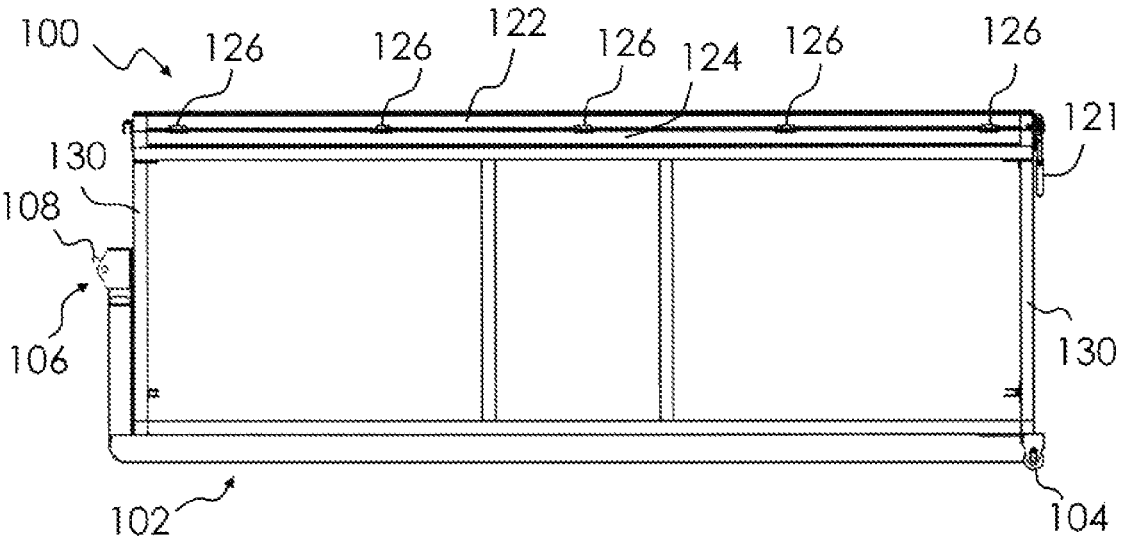
Figure 12:
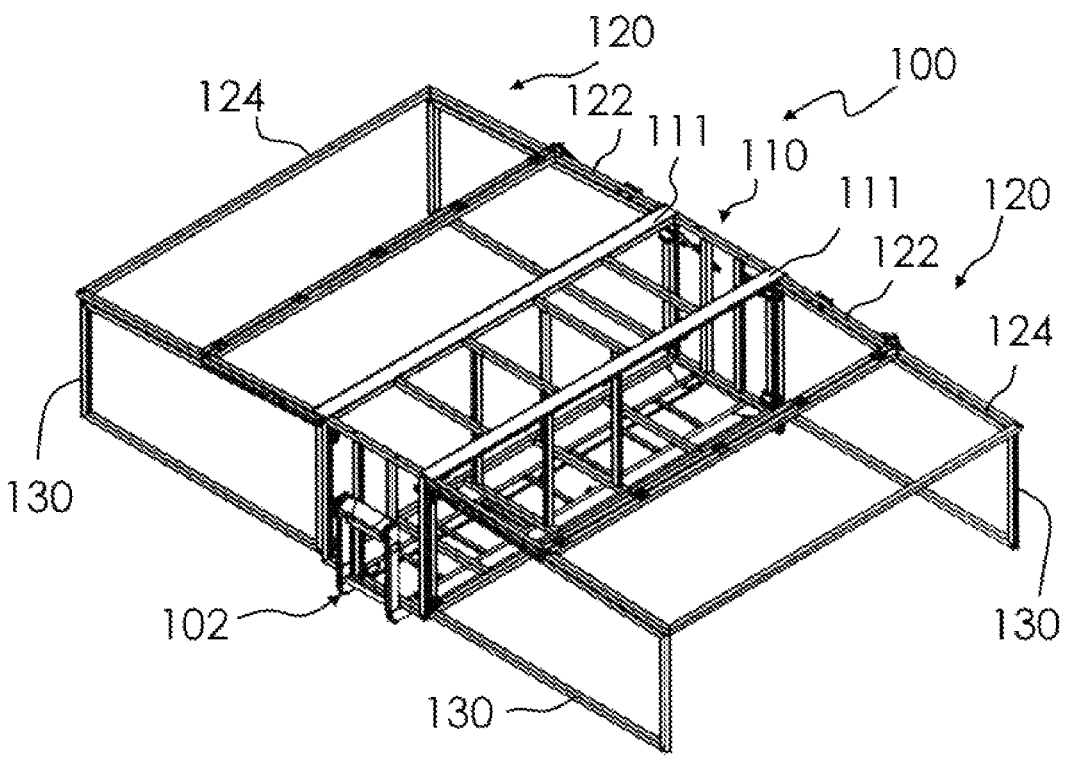
FIG. 12 shows a perspective illustration of the roll-off container according to the invention in a position of use.

FIG. 6 shows a lateral view of the roll-off container 100 in the position of use, wherein both the roof-frame sections 122, 124 as well as the side frames 130 are moved accordingly, as can be seen, in particular, from FIG. 12.

FIGS. 7-11 show components of the roll-off container 100 according to the invention.

Figure 7:
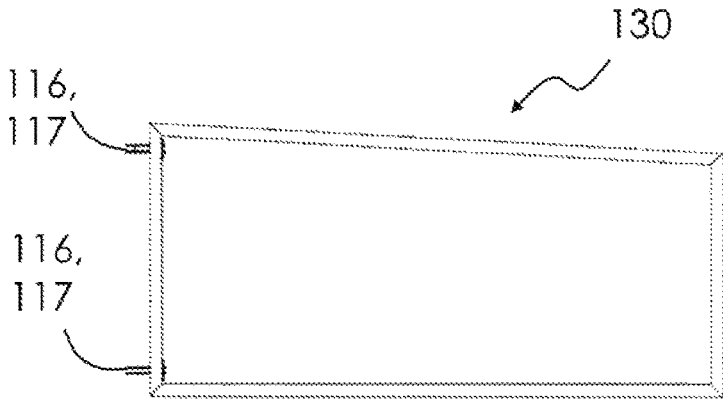
FIGS. 7-11 show components of the roll-off container according to the invention.

FIG. 7 shows a side frame 130 with parts of hinges 116, 117 for attachment to the lateral struts 114 of the main frame 110.

Figure 8:
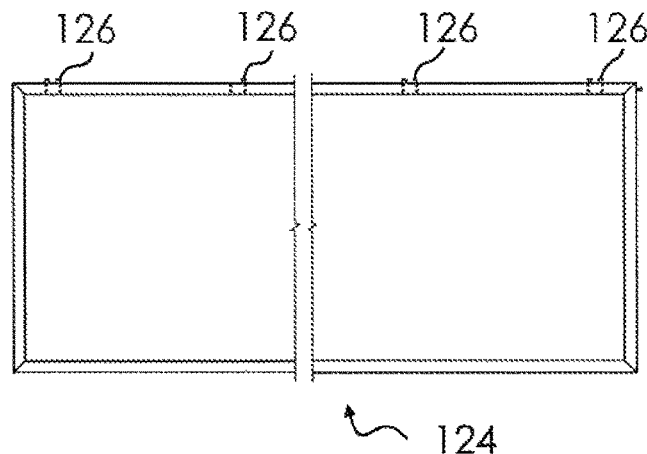

FIG. 8 shows a second roof-frame section 124, which can be connected to a first roof-frame section 122 via parts of the hinges 126 shown. The projecting pin (on the upper right side) is used to connect to a hydraulic cylinder 123, as shown in detail in FIGS. 15 and 16.

Figure 9:
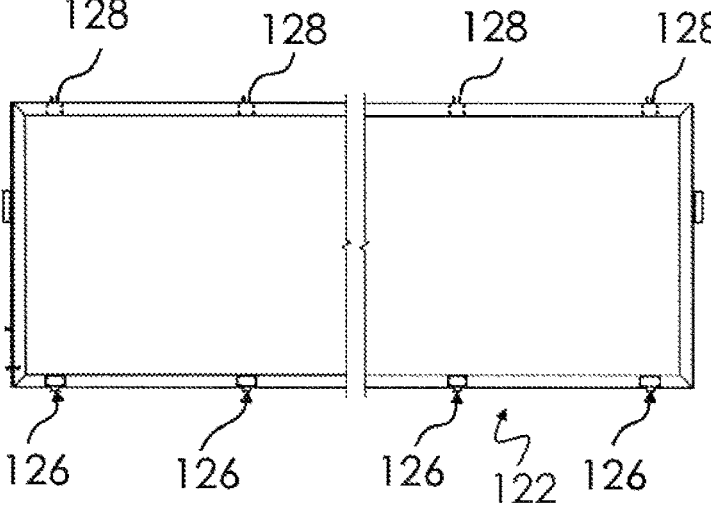

FIG. 9 shows a first roof-frame section 122, which can be connected to the second roof-frame section 124 shown in FIG. 8 via corresponding parts of the hinges 126 shown. In addition, the first roof-frame sections 128 can be connected to the main frame 110 on one longitudinal side of the main frame 110 via parts of the hinges 128 shown. The laterally projecting pins are used for coupling via a hydraulic cylinder 123, as shown in detail in FIGS. 15 and 16.

Figure 10:
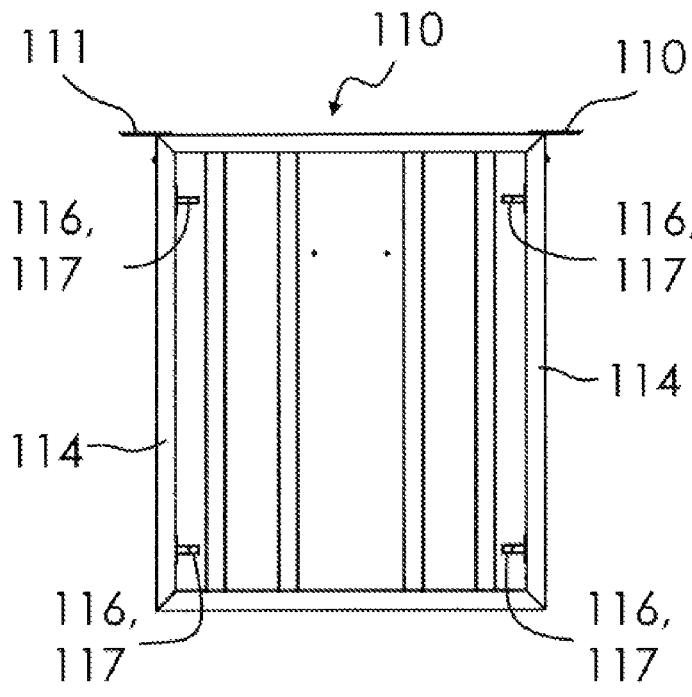

FIG. 10 shows a view of the main frame 110 without the side frames 130 and the roof structure 120 on either side of the main frame 110.

Figure 11:
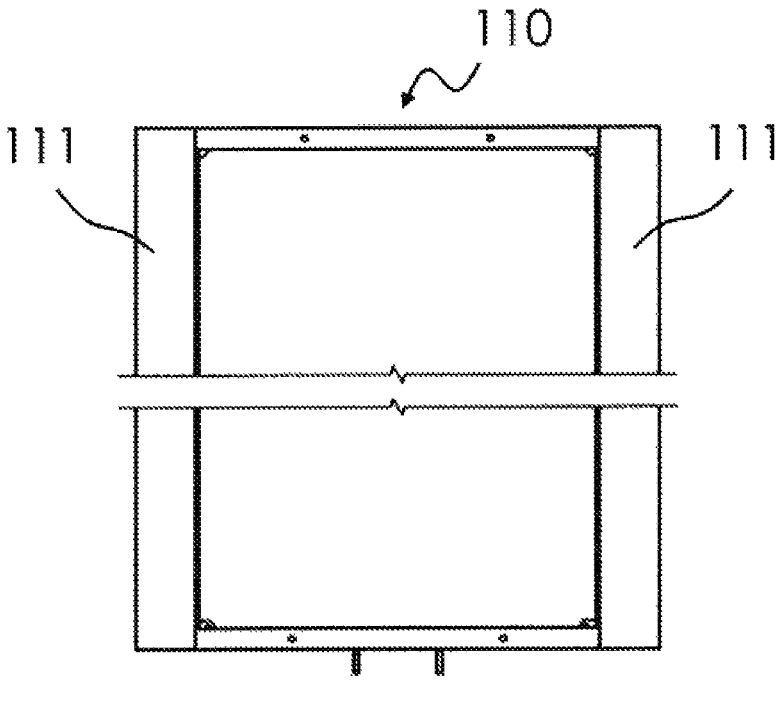

FIG. 11 shows the view from above of the main frame 110 in accordance with the illustration shown in FIG. 10.

FIG. 12 shows a perspective illustration of the roll-off container 100 according to the invention in a position of use. In the position of use shown above, both the roof structures 120 as well as the side frames 130 have been moved on both longitudinal sides of the main frame 110. Thus, the roll-off container 100 essentially covers an area five times as large in the position of use as in the position of non-use.

Figure 13:
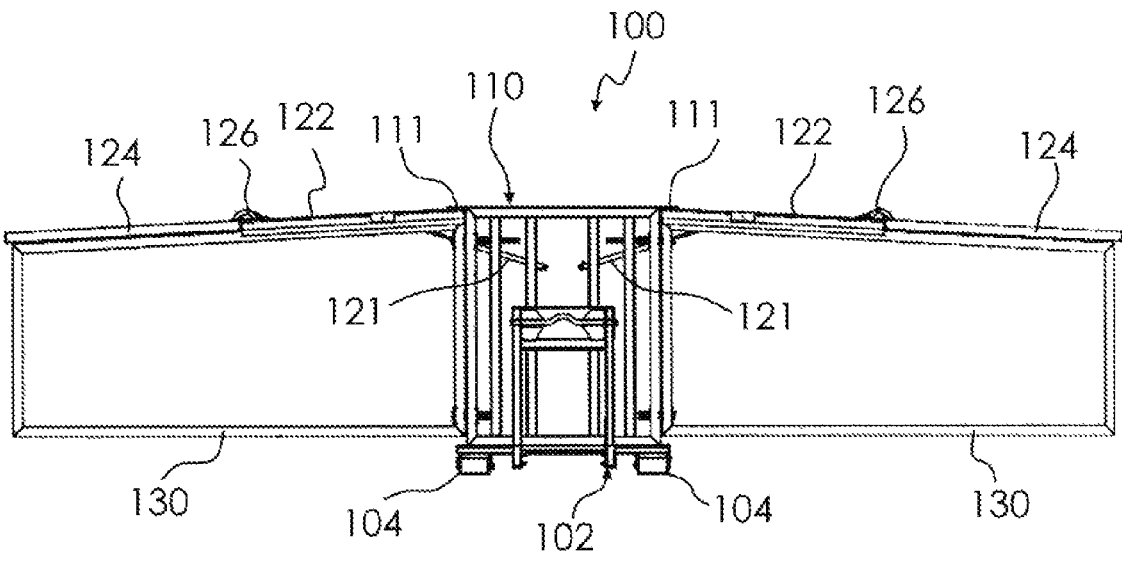
FIGS. 13-14 show different views of the roll-off container according to the invention in the position of use of FIG. 12.
Figure 14:
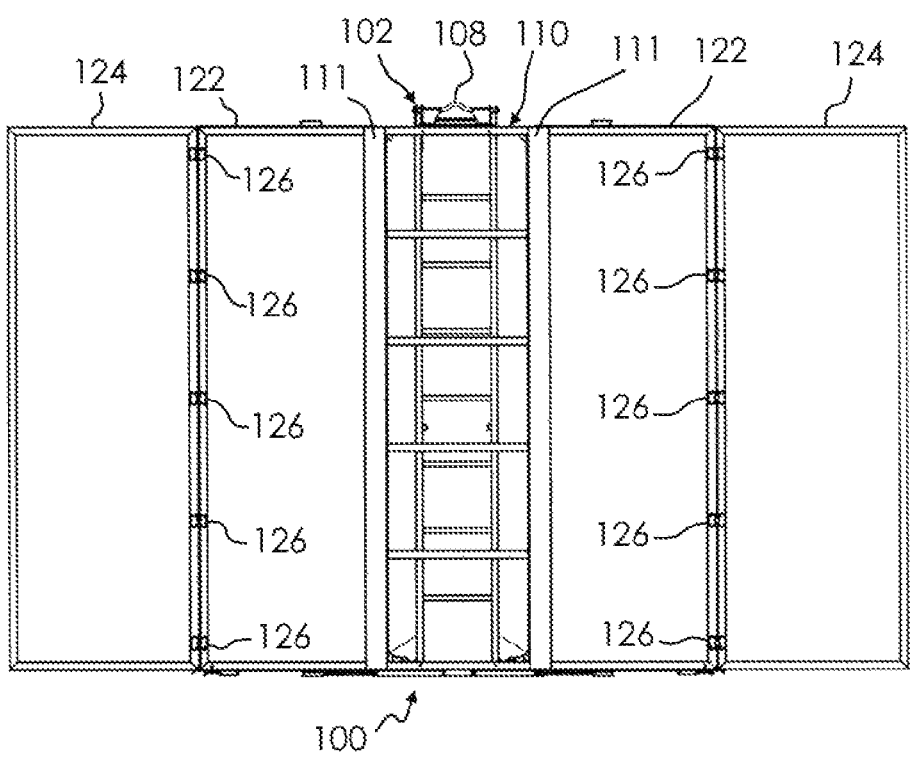

FIGS. 13, 14 show different views of the roll-off container 100 according to the invention in the position of use of FIG. 12.

FIG. 13 shows how the side frames 130 project orthogonally from the main frame 110 on both longitudinal sides of the main frame 110 and how the roof structure 120 (see also FIGS. 12, 15 and 22) with the two roof-frame sections 122 and 124 rests on the top sides of the side frames 130. The formation of the side frames 130 provides a sloping surface over the roof structure 120 (see also FIGS. 12, 15 and 22), which facilitates the drainage of rain.

FIG. 14 shows a top view of the roll-off container 100 in the position of use.

FIGS. 15-21 show states of components of the roll-off container 100 according to the invention when moved from the position of non-use to the position of use and vice versa.

Figure 15:
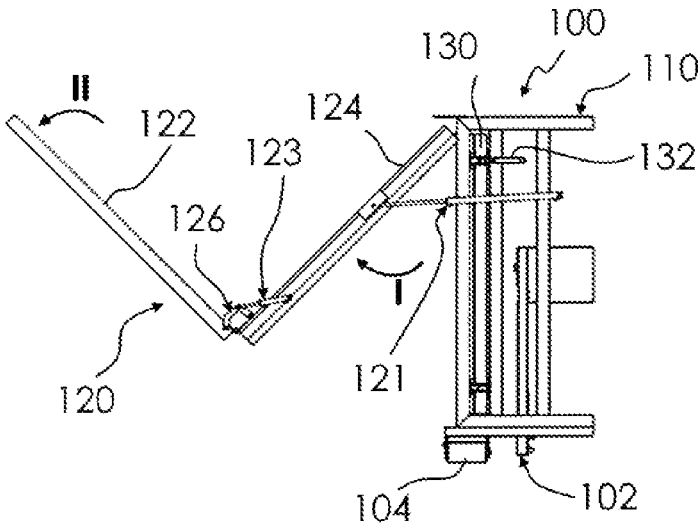
FIGS. 15-21 show conditions of components of the roll-off container according to the invention during transfer from the position of non-use to the position of use and vice versa.

FIG. 15 shows the formation of the connection between the roof structure 120 via the first roof-frame section 122 and the connection between the roof-frame sections 122 and 124.

Figure 16:
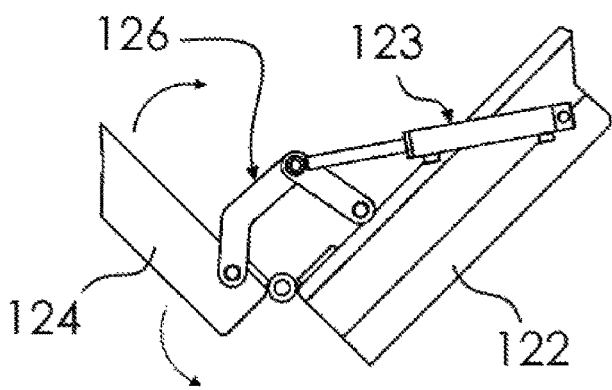

FIG. 16 shows an enlarged illustration of the formation of the junction between the first roof-frame section 122 and the second roof-frame section 124.

Figure 17:
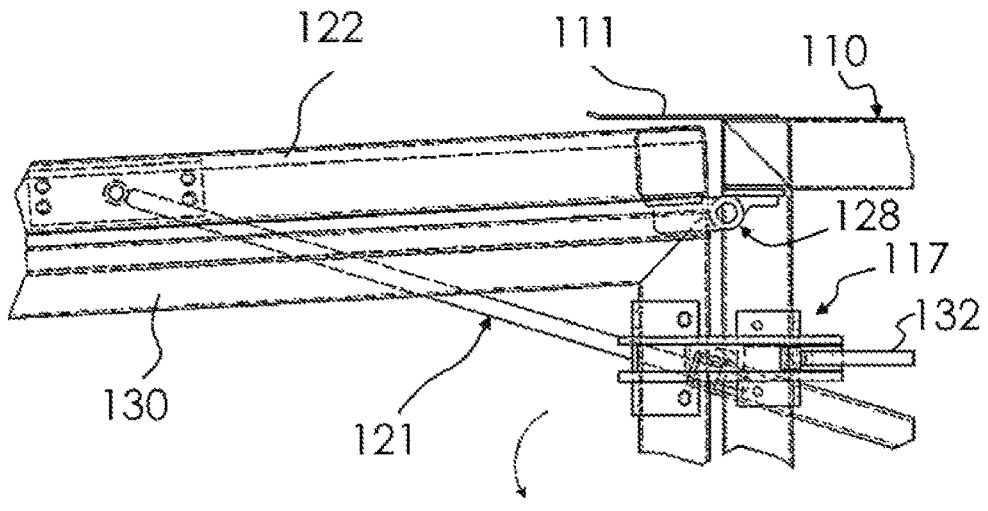
Figure 20:
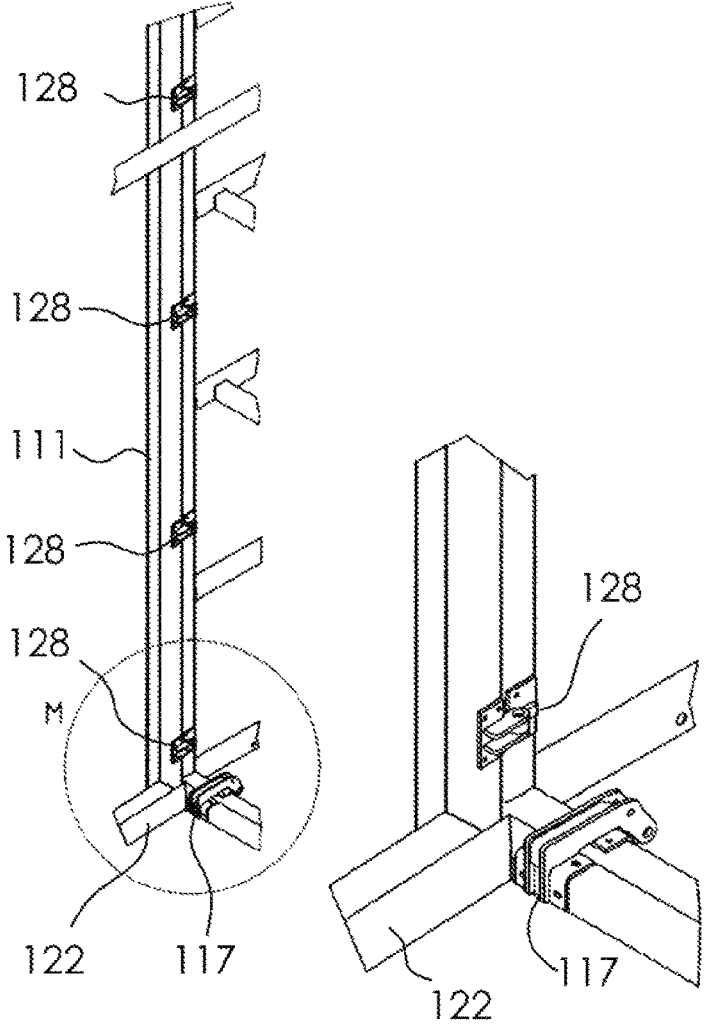

The first roof-frame sections 122 are connected to the main frame 110 by means of hinges 128 (see FIGS. 17, 20). Hydraulic cylinders 121 are arranged on the main frame 110, which are connected to the first roof-frame sections 122 at the other end, as shown in FIGS. 15 and 16. Actuation of the hydraulic cylinders 121 therefore causes either the first roof-frame sections 122 to be moved into the position of use (direction I) or into the position of non-use (opposing direction I).

Further hydraulic cylinders 123 are arranged on the first roof-frame sections 122, which are connected to the second roof-frame sections 124 via the lever arrangement shown. The actuation of these hydraulic cylinders 123 therefore results in either the second roof-frame sections 124 being moved into the position of use (direction 11) or into the position of non-use (opposing direction 11). The first and second roof-frame sections 122 and 124 are connected to each other by means of hinges 126.

Figure 18:
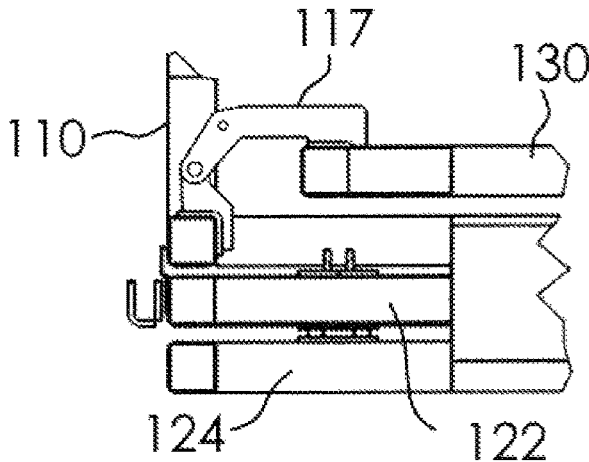
Figure 19:
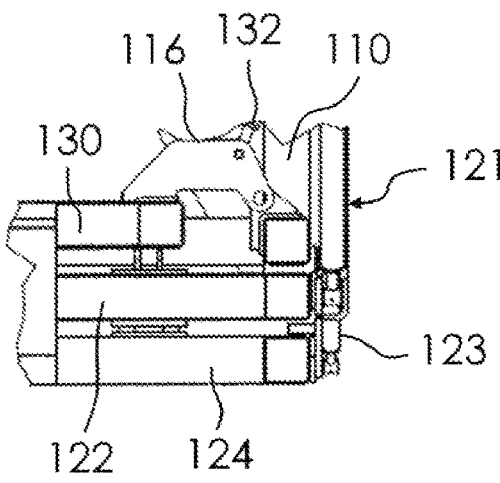

As shown in particular in FIG. 17, the side frames 130 can be moved from the non-position of use to the position of use (direction III for the face side frame 130 and direction IV for the rear side frame 130) and vice versa (corresponding opposing directions) via hydraulic cylinders 132, wherein the hydraulic cylinders 132 are connected to both the main frame 110 as well as the side frames 130. The embodiment of hinges 116, 117 for side frames 130 on the respective sides of main frame 110 is shown in FIGS. 18 and 19.

Figure 21:
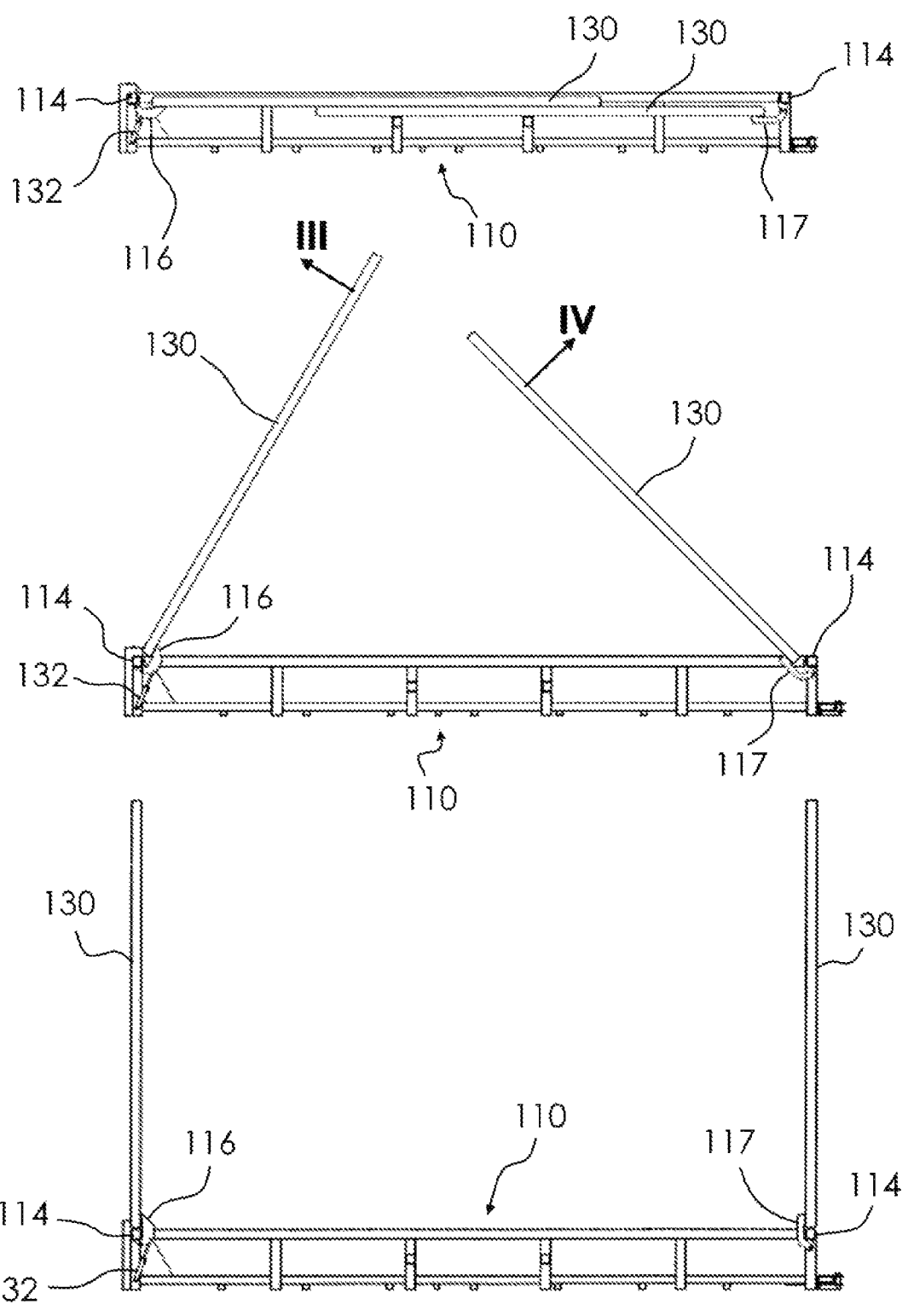

FIG. 21 shows the movement sequence for moving the side frames 130 from the position of non-use shown above to the position of use shown below. The two side frames 130 are offset on the corresponding sides of the main frame 110 so that they do not interfere with each other when retracting and extending.

When moving into the position of use, it is also essential that the roof structure 120 (see also FIGS. 12, 15 and 22) is first moved into the position of use, wherein the first roof-frame section 122 is first rotated in direction I before the second roof-frame section 124 is also rotated relative to the first roof-frame section 122 in direction II. When moving from the position of use to the position of non-use, the procedure is reversed.

Figure 22:
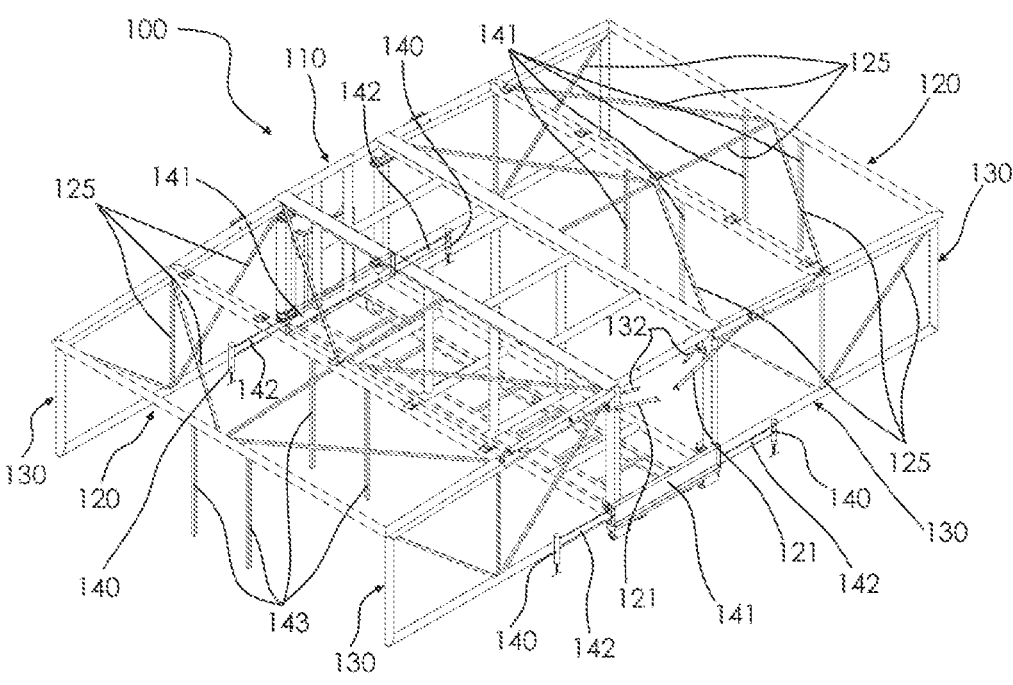
FIG. 22 shows a perspective illustration of a roll-off container of another embodiment in a position of use.

FIG. 22 shows a perspective illustration of a roll-off container 100 of another embodiment in a position of use. The roll-off container 100 of FIG. 22 differs from the other exemplary embodiment in that, on the one hand, the side frames 130 and the roof-frame sections 122, 124 (see above) of the roof structure 120 comprise diagonally and vertically running transverse struts 125 so that the roll-off container 100 becomes even more torsionally stable. The 125 transverse struts can be made of the same material as the 130 side frames and the 120 roof structure. Preferably, these can also be profile bodies or rails.

On the other hand, the embodiment of FIG. 22 furthermore differs in that laterally extendable supports 140 are provided on the platform 102. The supports 140 are arranged on the face side and on the opposite side and can be extended via other drive elements. In the case of the drive elements, for example, hydraulic drive elements, as described for the other drive elements.

FIG. 22 shows the extended position of the supports 140 in the position of use. In the position of non-use, the supports 140 are retracted and can be used for this purpose, for example, to run along their longitudinal extension below the main frame 110 or be rotated, wherein the supports 140 are then below or above the sides of the main frame 110.

Figure 23:
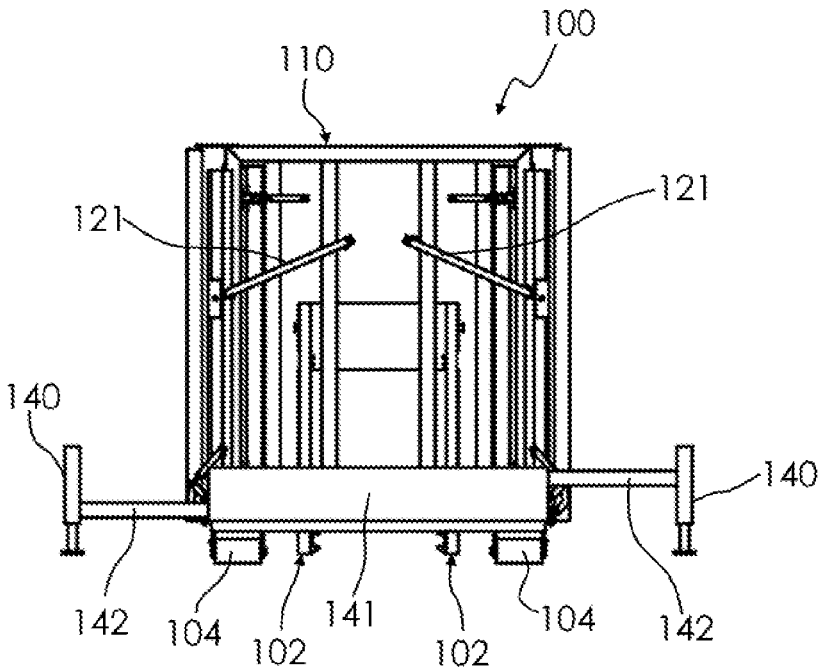
FIG. 23 shows a lateral view of the roll-off container with extended supports.
Figure 24:
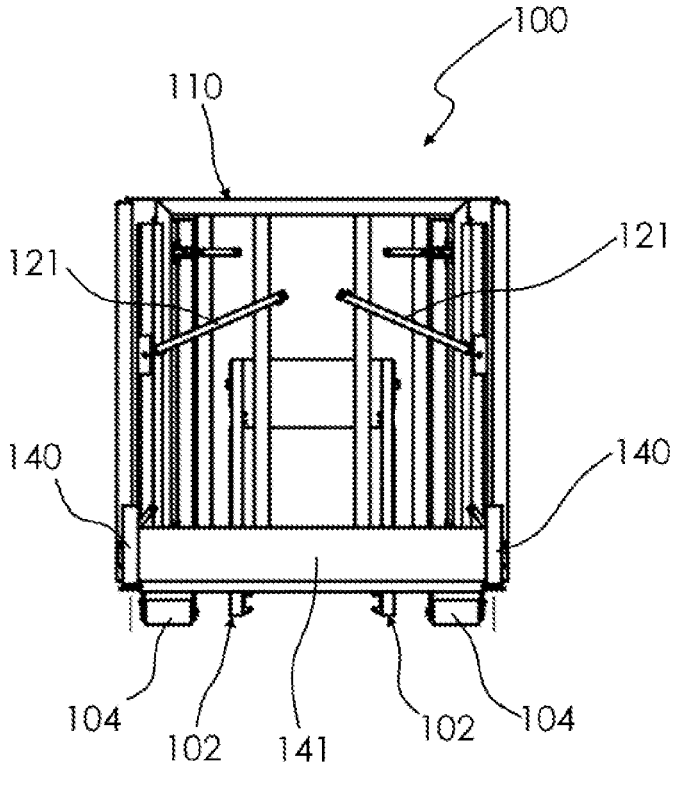
FIG. 24 shows a lateral view of the roll-off container with extended supports.

In accordance with the embodiment shown in FIG. 22 and FIGS. 23 and 24, support brackets 141 are provided for the supports 140, which run along the outside of the side frame 130. Supports 140 can be inserted into the support bracket 141, at least with regard to their guide rails 142, by means of a linear motor for example, after they have been lifted from the position of use/support position. They will then be in the support-bracket 141 rest position.

For functional use, the supports 140 can be designed, for example, as telescopic extendable hydraulic supports or the like, whose drive or at least parts of it can also be accommodated in the support bracket 141.

The control is carried out via the control system for the roll-off container 100. This means that the 140 supports can also be automatically moved into their position of use without human assistance.

Furthermore, the control system can be designed in such a way that the supports 140 are extended before the roof structure 120 is unfolded and the side frames 130 are rotated, or together with the folding-out of the roof structure 120. Preferably, the supports 140 are extended first so that the roll-off container 100 cannot tilt during assembly.

The extension of the two supports 140 at the front and rear ends of the roll-off container 100 means that the roll-off container 100 comprises a wider support in addition to the standing area via the two skids of platform 102. This allows the roll-off container 100 to be set up safely. A similar situation can be seen in FIG. 23.

This prevents the roll-off container 100 from tilting by the height between the ground and the bottom side of the side frames 130 (e.g., approx. 0.30 m) when folding/swivelling the side frames 130—depending on the operating conditions and weather conditions. For this purpose, after the roll-off container 100 has been set down, the supports 140 immediately extend to the side at the front and also at the rear to the right and left. These then have the same contact with the ground as the skids in the middle of platform 102. However, a "jacking up" of the roll-off container 100 is not achieved. There is only a wider support.

The 140 supports can be located directly on platform 102, below the main frame 110, or both (see also above concerning this). It is essential that the supports 140 in the extended position are essentially at the same level as the skids of platform 102.

Furthermore, according to the invention, supplementary support struts 143 can be provided. The support struts are used, in particular, to prepare the roll container 100 for special roof loads. These special roof loads can arise, for example, during heavy snowfall, storms or other extreme weather conditions or situations.

For example, the 143 support struts on the roof structure 120 can be folded out or folded down and can be provided with the structure of the roof structure 120, i.e., folded down and extended as required. Alternatively, the support struts 143 can of course also be carried along separately with the roll-off container 100 in a loose manner and, if necessary, attached to the roof structure and the struts running there, for example, hooked in and/or screwed together. The support struts 143 can be designed to be extendable or elongated for support on the substrate, for example, being designed to be capable of telescoping.

In the embodiment of the roll-off container 100, it is essential that the hydraulic cylinders 121, 123, 132 are controlled via a control system that receives control commands via an interface. The interface can include a connection to a control unit via a cable or wirelessly. For example, a smartphone with a corresponding app can be used to control the transfer to the position of (non-)use. The components required for this, such as a motor, etc. for example, are contained in a drive compartment of the roll-off container. In it, a power-supply unit can also be provided.

This means that the roll-off container 100 can be set up in a very short time, e.g., within approx. 3 minutes, thereby being fully sealed against and weather-protected from its surrounding area and available for various types of use.

The roll-off container 100 of the R.M.R.H. system is designed in such a way that it can be set up by only one person, for example, with a remote control or an app. After the roll-off container 100 has been set down, only one person completely sets up this system in a time of less than 3 minutes without human support to a large treatment area of over 81 m² for example. The space can then be equipped for 16 to 18 patients, for example, with standardized stretchers, or with 12 hospital beds.

The roll-off container 100 can be used not only as a treatment room, but also, for example, as an intensive-care unit, care unit, kitchen unit, operations control centre, pandemic station, decontamination unit and much more.

For example, the roll-off container 100 can have the dimensions of a standard container with a width of 2.55 m, a height of approx. 2.50 m and any length between 6.90 m and 7.50 m. The total height depends on the carrier vehicle used. The total height (vehicle and container 100) should not exceed 4.00 m.

The roll-off container 100 can be set down using a remote control or smartphone app alone. Thus, compared to well-known container and tent supply systems as well as pole and air tents, an enormous time improvement in pre-hospital disaster control, for example, in terrorist situations, is achieved, wherein a quick set-up is indispensable. This is also achieved by the fact that the roll-off container can have 100 fixed insulated side walls and an insulated roof. There, for example, airliner rails can be permanently installed, to which various objects can be attached with straps or other holding devices for example.

When not in use, a rectangular container is provided, which has standardized dimensions and can also be equipped with trolleys, etc., wherein the side walls can be opened by means of the new folding system.

Due to the space-saving arrangement of the roof structure 120 and the side frames 130 in the main frame 110 as well as the hinges 116, 117, 126, 128 and the hydraulic system with hydraulic cylinders 121, 123, 132 from a container area, the area of the basic container can be expanded to five times its size within a very short time (approx. 3 minutes) with only one operator, without muscle power and time.

On the longitudinal sides of the roll-off container 100 there is the double frame system with the side frames 130 and the roof structure 120, wherein a hydraulic system with a remote control or smartphone app first unfolds the first roof-frame sections 122 and then rotates the first roof-frame sections 122 and the second roof-frame sections 124 simultaneously. Simultaneously, the roof-frame sections 122 and 124 automatically seal at the points of contact. For this purpose, all contact surfaces of the frame sections of the roll-off container can have 100 sealing elements, which provide a seal in the position of use.

The moving parts of roll-off container 100 can be moved together or only on one side of roll-off container 100.

In the case of roll-off container 100, two hydraulic cylinders 121 push the roof structures 120 upwards (unfolded) to the side of the main frame 110, wherein the inner roof surface is established. The hydraulic cylinders 123 can also be controlled in a synchronous manner simultaneously or with a time delay, wherein the (opening) hinge 126 pushes the roof-frame sections 122, 124 open.

Hinges 126 open in a synchronous manner or unfold the second roof-frame sections and push them upwards (FIGS. 15, 16).

On both sides of the main frame 110 there is therefore a scissor-like folding system, which is used to increase the roof area.

This roof is twice as wide as the height of the roll-off container 100 or the main frame 110. The folded roofs have an angle of inclination within the range of 80 to 89 degrees, preferably 87 degrees so that rainwater can drain very well when open. Abutment edges can be provided on all frame sections and processed with seals so that the frame sections can be sealed.

Now that the roof of the roll-off container 100 has been fully opened in the position of use, the side frames 130 in the longitudinal direction of the roll-off container 100, which are essentially concealed in the position of non-use (see FIG. 5), are first pressed open by means of the hydraulic cylinders 132. Simultaneously, the respective second side frame 130 also opens in the same way with a slight time delay on the respective longitudinal sides of the main frame 110, which are installed in the longitudinal direction offset inwards or arranged in the position of non-use. The side frames 130 can lock themselves in the end positions due to the design of the hinges 116, 117.

The structure and control of the hydraulic cylinders 121, 123, 132 or other drive units in other embodiments make it possible to increase the space of 1:5 within a very short time (e.g., less than 3 minutes).

Due to the formation of the components of the roll-off container 100, the side frames 130 close tightly with the main frame 110 on the roof (or on the roof structure 120) as well as on the vertical frame on the lateral struts 114.

For example, the roll-off container 100 with the components that can be moved via hinges 116, 117, 126, 128 can provide a usable area of more than 32 m² per side, wherein the hinges 116, 117, 126, 128 and drive elements do not project into the space. This applies to both the position of use and the position of non-use so that maximum loading and utilization of the entire area or space of the roll-off container can be achieved.

Thanks to the innovative design, a complete, fully enclosed treatment room with fixed insulated side walls and roof surfaces is created in less than 3 minutes. The materials carried inside the roll-off container 100 are therefore quickly and dry for all parties involved in any weather (rain, storm, hail, etc.).

On the open side frame 130, a compensating support or an additional holding and stabilizing support, which is hydraulically or mechanically adjustable, can also be installed in the frame at the outer corners. Such supports can also be controlled via the control system and thus automatically moved. The supports can be used to provide the roll-off container 100 with additional support against tipping over at an inclined position.

In the case of roll-off container 100, only one side can also be opened as required, wherein the space within the main frame 110 is still available for treatment, etc., and the closed side is tightly closed up and sealed.

For example, the hydraulic system of the R.M.R.H. system or roll-off container 100 can have two hydraulic pumps and provide a power supply of 24 volts. For this purpose, appropriate devices are provided in a separate area of roll-off container 100, for example in the area of the face side. A hydraulic pump can be provided for each side of the roll-off container 100. If a hydraulic pump or a control system fails on one side, the other hydraulic pump/control system can be used to open and close. For this purpose, a changeover system is installed. In the initial phase, the power supply can be provided by the swap-body vehicle (carrier) via a 24 volt socket. Thus, the power supply and the operation (construction) of the roll-off container 100 are always guaranteed, as the carrier supplies electricity as long as it is in operation. In other embodiments, the power supply for roll-off container 100 can be provided via an internal power storage device or a socket that is connected to an on-site power grid.

In other embodiments, the roll-off container 100 can have its own heating, air conditioning and emergency power supply system, which can also provide an emergency power supply system for the hydraulic system in the case described above. However, a further feed-in with electricity can also be carried out by an external power supply via a socket installed on roll-off container 100. The external power supply can be provided by an existing power supply or by an emergency generator.

For waterproofing in the position of use with relation to the floor, a tarpaulin with a bead can be attached to the outer side of the side frames 130, which can be filled with air, water or sand, for example. In this way, it is also possible to compensate for any unevenness in the ground. The bead can be made of a truck tarpaulin fabric and filled with a total capacity of 1500 litres in the embodiment of the roll-off container 100 shown, for example. This means, for example, that a gap of approx. 0.30 under the side frame 130 that has not yet been sealed can be sealed all the way to the ground, wherein the roll-off container 100 is simultaneously weighed down by 1.5 tonnes. By filling, uneven ground (e.g., kerbs) can also be compensated for or sealed. This means that the roll-off container 100 in the embodiment shown can be made even heavier with a dead weight of over 4 tons, wherein the additional weight does not have to be transported along with it. The roll-off container 100 can therefore be set up in the position of use up to a wind force of 8.

In other embodiments, tarpaulins (e.g., truck tarpaulins) can be attached to the front areas of the second roof-frame sections 124, which are opposite the first roof-frame sections 122 in the position of use, for example, with a piping rail. Firstly, these tarpaulins serve as a tarpaulin cover for the complete roll-off container 100 and can be used as a side wall on the longitudinal side in the position of use. In addition, these tarpaulins can also be provided with a bead and can also be filled with air, water or sand or a similar material, wherein the entrance area can be provided in the middle of the side wall.

Keder rails can be attached to these tarpaulins.

If a plurality of R.M.R.H. systems or roll-off containers 100 are to be connected to each other on the longitudinal side, the complete side wall with the bead can be removed on the longitudinal side via the connection with the piping rail and replaced by a connecting piece.

Since Keder rails can be attached to each side, the tarpaulins and connecting pieces can be easily threaded in. These connecting pieces are designed in such a way that they are not the same width along the entire length, but are different, which means that the connecting piece acts as a roof tarpaulin that acts like a rainwater gutter on one side. The arrangement can provide a drain on both sides of the connecting piece as desired. After the formation of the rainwater gutter, the connecting piece can run sideways downwards and seal the side frames 130 all the way to the ground.

For example, two roll-off containers 100 can be connected to each other in the position of use via such a connecting piece, wherein an additional increase in space is achieved. For example, in the design of roll-off containers 100, the area of 81.5 m$^2$, i.e., a total area of approx. 163 m$^2$, can be provided twice in accordance with the embodiment shown. To do this, two roll-off containers 100 must first be set up next to each other.

For universal applicability and optional air conditioning, the system or the roll-off container 100 can possess a floor in other embodiments. For example, the floor (e.g., in the form of a tarpaulin) can be located on a roll below the roll-off container 100. This extends from the attachment roller 104 of the roll-off container 100 along the entire length to the face side with hook 106. The floor can be made in such a way that it is double welded on the sides. After pulling out the floor on the surface, the floor tarpaulin can be attached to the side frame 130 in just a few simple steps on the lower side. Thus, in essence, a tub is created.

If the roll-off container is completely unfolded or set up, a treatment room of over 81.5 m$^2$ is provided within a maximum of 5 minutes in the embodiment shown.

The exemplary embodiment shown refers to the possible applications in the field of medical services. However, other uses are also provided.

For example, as a transport vehicle, wherein the roll-off container 100 can hold all the material for a treatment station for 50 to 100 people for example.

This means that the roll-off container 100 can be used immediately as a treatment station for approx. 50 injured/ill people. This is done regardless of the substrate and weather conditions.

The roll-off container 100 can also be used as an additional intensive-care unit, e.g., in the event of pandemics (COVID-19). Intensive-care patients can also be cared for through pre-installed connections (oxygen, electricity 12 volts, 220 volts, and network cables, etc.) in the side walls of the roll-off container 100, which comply with the usual standards and specifications, as well as through the possibility of properly attaching and connecting medical devices to the walls at the patient's head height. For this purpose, appropriate devices inside the roll-off container 100 is accessible, particularly in the position of use. For this purpose, for example, airliner rails can be installed vertically and/or horizontally in the side walls.

The roll-off container 100 can also be used as an accident-aid centre at major events, such as open-air rock festivals, folk festivals, concerts, which are regularly operated over several days.

Other uses include use as an evacuation station or as an isolation station. It can also be used as an interim storage facility in the event of hospital fires or the like with the roll-off container 100, for example, during the evacuation of MRSA patients from an entire ward in a rehabilitation clinic. The ambulances are not needed to transport patients and are available for other tasks.

Furthermore, the roll-off container 100 can also be used as an intensive-care unit. Compared to tents, the structure allows complete disinfection.

Finally, the roll-off container 100 can also be used as a dressing station or mobile vaccination station.

Other possible uses of the R.M.R.H. system or the roll-off container 100 within the framework of the support service: Equipped with a Complete Canteen Kitchen The roll-off container 100 can also be set up as a kitchen instead of medical equipment and is also available in the shortest possible time for food preparation and then also for food intake by those affected. All hygiene regulations that must be observed when preparing and serving food can be complied with much more easily in this fixed and weather-independent system than with a conventional "goulash cannon" (old field kitchens) and food distribution in tents, wherein the requirements of the EU Hygiene Regulation are complied with.

Care:

The care of uninjured participants, as well as the handling of the necessary administrative measures (registration, etc.) can also be carried out in a roll-off container 100, regardless of the weather.

Roll-off containers 100 can also be used with appropriate devices for the command of fire brigades, etc.

For example, a "dangerous goods" facility can be equipped with a load of hazardous substances and with a decontamination device, for example, shower systems. The material can be transported by the fire brigade as well as used as accommodation when the material is unloaded. It is also possible, for example, to use the middle section of roll-off container 100 ("main frame 110") as a technical operations control and meeting room.

The described system with roll-off containers 100 according to the invention offers the possibility of fast transport and the provision of space, wherein, compared to all known fire-brigade, rescue-service and disaster-control systems, a very large improvement is achieved for the reasons explained above, thereby including, above all, considerable time savings and speed.

It is also possible, for example, to provide a complete outpatient clinic, for example, a fever outpatient clinic, within a short period of time by means of a plurality of roll-off containers 100 according to the invention.

In other embodiments, additional equipment is planned, such as central ventilation and air conditioning systems as well as connected pipes within the frame sections of the roll-off container 100, supply lines and receiving points for various devices and facilities for example. In addition, integrated devices can be provided inside the roll-off container 100 in the area of the main frame 110, which can be moved within the main frame 110 in order to form furniture or treatment stations in the position of use for example. Lighting can also be provided for the interior in the main frame 110 and the side rooms in the position of use, as well as on the outer sides of the roll-off container 100, which, like the other devices, can also be controlled remotely via a smartphone app.

Although the invention has been further illustrated and described in detail by the favourable exemplary embodiments, the invention is not limited by the disclosed examples. Other variations can be deduced from this by the person skilled in the art without leaving the scope of protection of the invention. In particular, the invention is not limited to the combinations of features given below, but other combinations and partial combinations which are obvious to the person skilled in the art can also be formed from the disclosed features.

REFERENCE LIST 100 roll-off containers
102 platform
104 attachment rollers
106 hook
108 transverse strut
110 main frame
111 overhang
114 lateral struts
116 hinge
117 hinge
120 roof structure
121 hydraulic cylinder
122 first roof-frame section
123 hydraulic cylinder 124 second roof-frame section
125 transverse strut
126 hinge
128 hinge
130 side frame
132 hydraulic cylinder
140 support
141 support bracket
142 guide rail
143 support struts

What is claimed is:

1. A Roll-off container, comprising:
a main frame arranged on a platform,
wherein the roll-off container comprises a rectangular base area, and the platform comprises attachment rollers on its bottom side and an upward-pointing hook with a transverse strut on a face side,
wherein the main frame comprises a bottom, side walls, and roof sections, and
wherein, on an upper end of the main frame on both longitudinal sides, a roof structure is rotatably mounted,
wherein the roof structure comprises at least first and second roof-frame sections, each having a width of equal to a height of the side walls of the main frame, and a length of which corresponds to a length of the main frame,
wherein the first roof-frame section can be moved via at least one first drive element, and the first roof-frame section with the second roof-frame section can be moved via at least one second drive element,
wherein side frames are rotatably mounted on lateral struts of the main frame on both sides respectively on a front end and a rear end of the main frame,
wherein the side frames, starting from a connection point on the main frame, have a height sloping towards an end,
wherein the side frames can be respectively rotated via at least one third drive element,
wherein an enlargement of a base area of the roll-off container can be provided in a position of use via the rotatably mounted side frames and the roof structure, and
wherein the rotatably mounted side frames and the roof structure can be moved via remote control.

2. The Roll-off container according to claim 1, wherein:
the first roof-frame sections and/or the second roof-frame sections-on their facing sides in the position of use each comprise at least one seal, and/or
the first roof-frame sections and/or the main frame on their facing sides in the position of use each comprise at least one seal, and/or
the side frames and/or the main frame on the lateral struts on their facing sides in the position of use each comprise at least one seal, and/or
the side frames and/or the first and second roof-frame sections of the roof structure-on their facing sides in the position of use each comprise at least one seal.

3. The Roll-off container according to claim 1, wherein:
the first roof-frame sections and the second roof-frame sections are connected to each other by at least one hinge on the lateral struts, and/or
the first roof-frame sections and the main frame are connected to each other by at least one hinge on the lateral struts, and/or
the side frames and the main frame are connected to each other by at least one hinge on the lateral struts.

4. The Roll-off container according to claim 1, wherein below the main frame a rotatable roller is arranged on both longitudinal sides, on which a floor tarpaulin is wound up so that it can be unrolled.

5. The Roll-off container according to claim 4, wherein the floor tarpaulin in an unrolled state in the position of use is connectable to bottom sides of the side frames.

6. The Roll-off container according to claim 1, wherein:
   a downwardly projecting tarpaulin is arranged on bottom sides of the side frames (130) or provided to be connectable to it, and
   the tarpaulin comprises a section at its bottom side which can be filled in order to compensate for unevenness with relation to a substrate, to seal it and to weigh down the roll-off container in addition to securing it.

7. The Roll-off container according to claim 1, wherein the main frame comprises an overhang on each of the longitudinal sides, on the bottom side of which at least one seal is arranged, which rests against the respective first roof-frame section in the position of use.

8. The Roll-off container according to claim 1, wherein supports are provided on the side frames-which are provided to support the side frames and are variable in length.

9. The Roll-off container according to claim 1, further comprising:
   a supply unit comprising components for power supply, air conditioning and heating, and a contact interface for external energy, information, material and water supply.

10. The Roll-off containers according to claim 1, wherein the roof-frame sections each comprise fasteners on their free sides over which side walls and/or connecting elements can be attached.

11. The Roll-off container according to claim 1, wherein supply lines for power supply, communication and/or material supply are arranged in the main frame, in the side frames and/or in the roof-frame sections.

12. The Roll-off container according to claim 1, wherein the side frames and/or the roof-frame sections have transverse struts.

13. The Roll-off container according to claim 1, wherein supports are arranged on the platform and/or on the main frame which are extendable or rotatable by means of at least a fourth drive element to widen the support of the roll-off container.

14. The Roll-off container according to claim 1, further comprising:
   a control unit connected to the drive elements by means of actuating the drive elements,
   wherein the control unit comprises an interface for remote operation of the adjustable side frames and roof-frame sections.

15. The Roll-off container according to claim 14, wherein the interface is a contactless interface or an interface with a physical contact.

16. A System, comprising:
   first and second roll-off containers according to claim 1; and
   a connecting tarpaulin arranged between the first and second roll-off containers,
   wherein the connecting tarpaulin can be connected to corresponding sides of the roof-frame sections, and
   wherein the connecting tarpaulin has a length corresponding to the corresponding roof-frame sections and a width varying over the length so that in a parallel arrangement of the roof-frame sections the first and second roll-off containers, a rainwater gutter is provided over the connecting tarpaulin.

17. An Equipment trolley system, comprising:
   a swap-body vehicle; and
   the roll-off container according to claim 1.

18. The roll-off container according to claim 1, wherein the roll-off container is configured to be used as at least one of the following:
   a means of transport,
   a treatment container,
   an intensive-care unit,
   an accident-aid unit,
   an evacuation station,
   an isolation station,
   a decontamination station,
   a radio reporting unit,
   a kitchen,
   a supply depot,
   an observation station,
   a shelter, and/or
   a first-aid station.

\* \* \* \* \*